Figure 3:
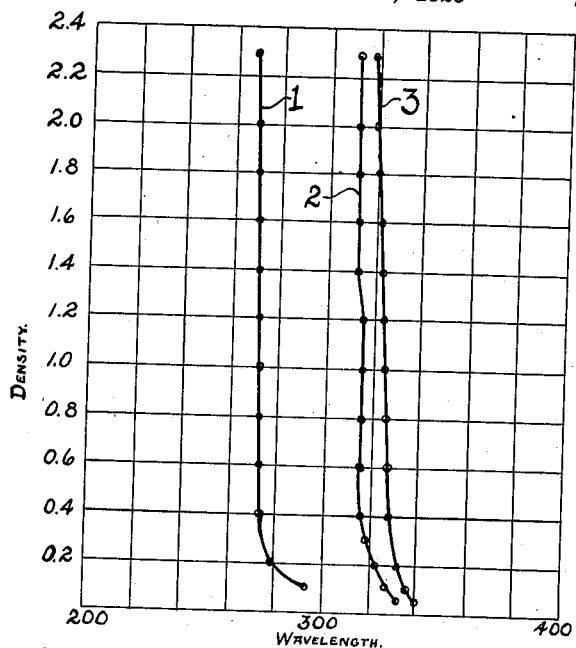

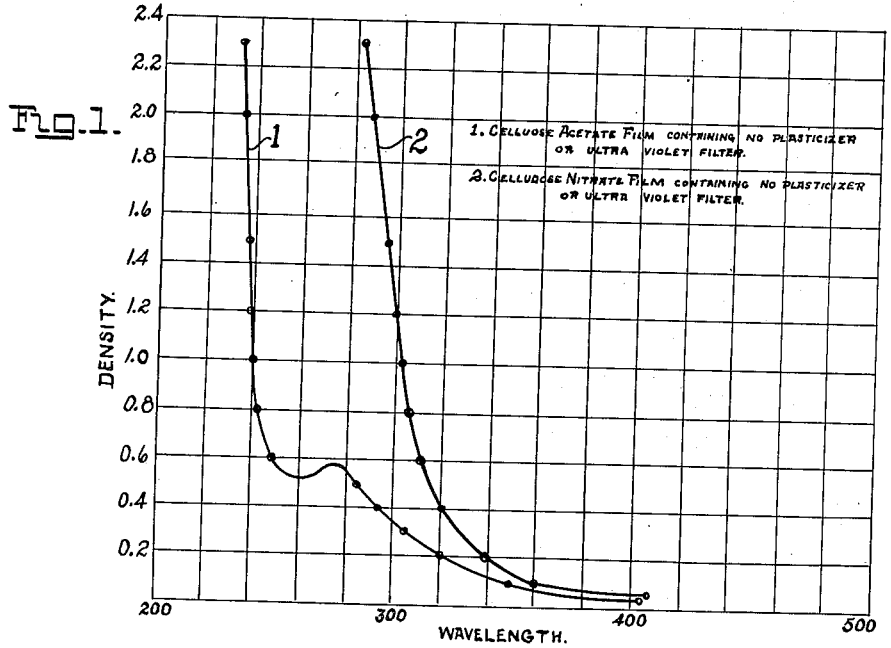
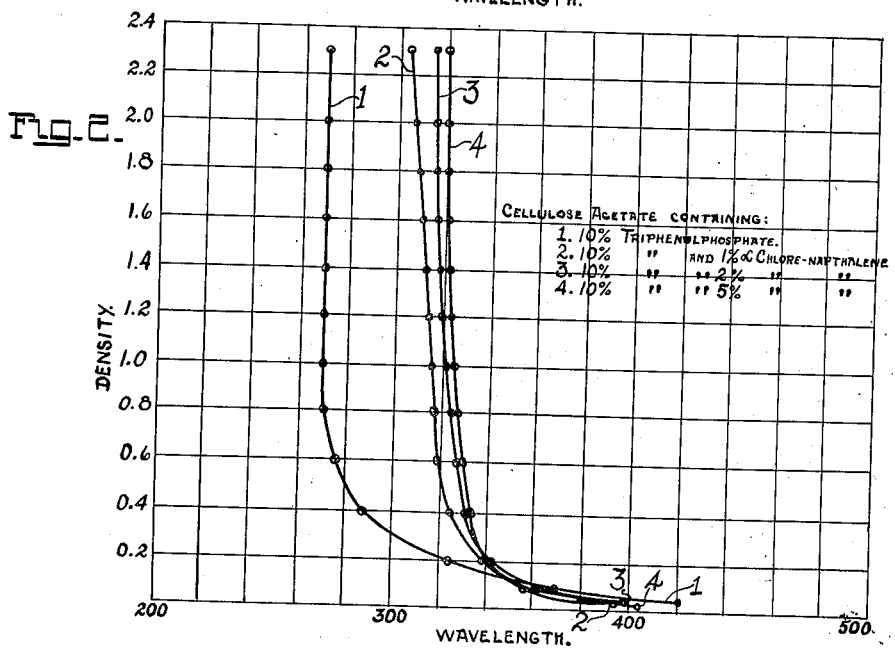

Oct. 15, 1935.  E. E. RICHARDSON ET AL  2,017,165
CELLULOSE ACETATE PROTECTIVE COATING
Filed Nov. 30, 1929   2 Sheets-Sheet 2

1. TRIPHENYLPHOSPHATE IN ETHYL ALCOHOL. 1-500
2. NAPHTHALENE IN ETHYL ALCOHOL. 1-500
3. ALPHA CHLORO NAPHTHALENE IN ETHYL ALCOHOL 1-1000

1. CELLULOSE ACETATE CONTAINING 2% NAPHALENE
2. CELLULOSE ACETATE CONTAINING 5% NAPHALENE.

Inventors
Earl E. Richardson.
Cyril J. Staud.
By Newton M. Perris
Daniel J. Mayne
Attorneys Patented Oct. 15, 1935

2,017,165

UNITED STATES PATENT OFFICE 2,017,165

CELLULOSE ACETATE PROTECTIVE COATING

Earle E. Richardson and Cyril J. Staud, Rochester, N. Y., assignors to Eastman Kodak Company, Rochester, N. Y., a corporation of New York Application November 30, 1929, Serial No. 410,708

5 Claims. (Cl. 91—68)

This invention relates to a new type of cellulose acetate lacquer coating, and particularly to such types of lacquer coatings which are over-coated on other lacquer surfaces whereby the latter are protected from the short rays of the spectrum.

The cellulose nitrate lacquer industry has increased tremendously in the past few years due primarily to the ease with which this lacquer may be coated upon metallic and other surfaces, and to the rapidity with which this lacquer dries. In the automotive industry particularly its use has released considerable of the materials which formerly were held in process and has therefore decreased greatly the expense incident to their coating and finishing. From the consumers' standpoint, however, cellulose nitrate lacquers have not appreciably increased the period of time during which his automobile is kept from corrosion and in which his car retains its initial glossy appearance, it being a well-known fact that the cellulose nitrate loses its gloss with relatively great rapidity when exposed to the elements. The delustering and decomposition of the cellulose nitrate surface, while to some extent due to inclement weather conditions, is nevertheless primarily due to the ultra-violet rays from the sun which penetrate and decompose the surface layers.

While the addition of pigment gums and plasticizers to the cellulose nitrate composition aid to a slight extent in rendering the cellulose nitrate layer less affected by the ultra-violet light, the protection they afford is not by any means complete. With even a considerable amount of these constituents in the lacquer there is, nevertheless, upon the surface a goodly proportion of the cellulose nitrate exposed to the solar radiation. Moreover it has been found that the exposed cellulose nitrate under such conditions will be decomposed by the ultra-violet light incident to its surface. Furthermore, decomposition of the exposed cellulose nitrate will auto-catalyze the underlying cellulose nitrate particles which are in immediate contact with them. This auto-catalysis of the cellulose nitrate gradually creeps through the whole surface and with a resultant decomposition with whitening and loss of luster. To obviate this difficulty it has been suggested that a high gloss varnish or other transparent material be overcoated on the nitrate to inhibit the breakdown of the cellulose nitrate coatings. While it has been previously suggested to overcoat nitrate lacquers with a clear lacquer containing cellulose acetate we find that the protective effect of such acetate lacquer coating may be materially improved, particularly from the standpoint of light protection, by preparing it in accordance with our invention.

An object of the present invention is to provide a filter for the absorption of the short light rays of the spectrum. Another object is to provide a cellulose acetate surface or over-coating which absorbs substantially all the ultra-violet light which has a deleterious effect upon the sub-coating. A further object is to provide a cellulose acetate lacquer which having been applied in the usual manner absorbs many of the decomposing light rays. Other objects will hereinafter appear.

We have found that cellulose acetate which contains a small percentage of napthalene or chlorinated napthalene, such as alpha or beta chloronaphthalene, has the unexpected property of inhibiting the passage of ultra-violet light. From our studies it is evident that either of these ingredients acts as a filter to the ultra-violet light, preventing its passage through the film. In the accompanying drawings will be found several spectrophotometric curves which very adequately depict the absorbing power of these compounds. The spectrophotometer, as is well known, is a combination of a spectroscope and photometer into a single instrument which enables not only the wave lengths at which absorption takes place to be measured, but also the intensity of such absorption. In the accompanying drawings the abscissæ represent wave lengths in terms of millimicrons (1 millimicron equals 10 Ångstrom units). On the ordinates are plotted the optical densities, the optical density being the logarithm of the reciprocal of the transmission. Expressed mathematically, if $I_0$ represents the incident light, and $I_1$ the emergent light, then it follows that the transmission is a fraction of the total incident light represented as $I_1/I_0$, some having been absorbed by the material. The converse of transmission would, of course, be opacity and be expressed by $$\frac{I}{T}$$

with T as the transmission. This expressed in terms of the original symbols would be $I_0/I_1$ and the optical density is equal to the logarithm to the base ten of the opacity.

The accompanying table may be of assistance in reading these spectrophotometric terms and the attached drawing:

| Transmission | Opacity | Density |
| --- | --- | --- |
| 1 | 1 | 0 |
| 0.5 | 2 | .3 |
| .25 | 4 | .6 |
| .1 | 10 | 1 |
| .01 | 100 | 2 |
| .001 | 1,000 | 3 |

In the spectrophotometric curves for cellulose nitrate shown in Figure 1, curve 2, it will be observed that absorption begins at a wave length of approximately 400 millimicrons, and that at 300 millimicrons over 90% of the light has been absorbed, while at 290 millimicrons nearly 99% of the light has been absorbed, and approximately 1% is transmitted.

From curve 1 of Figure 1 it is clearly seen that the use of cellulose acetate alone as an overcoating for cellulose nitrate lacquer would be entirely ineffective in affording protection from ultra-violet light since the entire absorption curve of cellulose acetate lies in a shorter wave length than those of cellulose nitrate shown by curve 2, Figure 1, the main portion of the curve lying between 230 and 250 millimicrons. In this instance, of course, the cellulose acetate has no light filter present therein. Cellulose acetate as an over-coating for cellulose nitrate, however, may be used as a vehicle for other materials, since in the terrestrial atmosphere no ultra-violet light of wave lengths 230 to 250 millimicrons occur. This is due to the presence of a sharp absorption band produced by what is thought to be due to ozone or other light filtering material in the earth's upper atmosphere which absorbs practically all radiation between 220 and 288.5 millimicrons. It is thus evident that the cellulose acetate itself will not decompose as rapidly as cellulose nitrate when subjected to the sun's rays, as the rays which decompose it do not reach the surface of the earth.

In measuring spectrophotometric characteristics of cellulose acetate containing alpha chloronaphthalene as a filter, it was found, as shown in Figure 2, curve 2, that the spectrophotometric curve gave absorption for all wave lengths shorter than 320 millimicrons. When a cellulose acetate film containing alpha chloronaphthalene is coated, therefore, upon cellulose nitrate, the latter would, of course, be protected from all ultra-violet wave lengths shorter than the 320 millimicrons. If alpha chloronaphthalene could be coated in a thin film upon a surface and would impart to that surface the good appearance and physical protective properties that are required for all manufactured products today, it would serve very well in protecting the sub-layer. Such an expedient is, however, practically impossible. It is, therefore, necessary to dissolve the ingredients in a suitable vehicle, or carrier, which in itself acts as a suitable finishing surface to the article. It will be understood, therefore, that we shall not be limited to the use of naphthalene or the halogenated naphthalenes or their equivalents, in cellulose acetate composition solely, as this ester is by no means the only medium which may act as a suitable vehicle. The mixed cellulose nitro acetate containing a very small amount of nitrogen dioxide may be employed or any of the organic esters of cellulose which, of course, are not deleteriously attacked by the ultra-violet light emitted by the sun may be utilized, or for that matter, any of the oxidizing gums and oils which have had such extensive use in the past for the coating of surfaces.

We have determined the absorption of ultra-violet light obtained by thin layers of naphthalene and alpha chloronaphthalene without the use of a carrier or a vehicle. We have compared the absorbing power of these compositions which in the lacquer art are known as plasticizers with the well known plasticizer, triphenylphosphate. All of these so-called plasticizers have advantageous uses in cellulose acetate for their plasticizing effects. However, when tested for their absorption of the ultra-violet, we found that triphenylphosphate films would not absorb the ultraviolet above 270 millimicrons, see curve 1, Figure 3, while a naphthalene absorbs all light rays shorter than 312 millimicrons, curve 2, Figure 3, and below 320 millimicrons, curve 3, Figure 3. It is therefore evident that triphenylphosphate would be of no use from the standpoint of ultra-violet absorption.

It is not necessary that a large percentage of these constituents be used to render the cellulose actate film able to stop the passage of the ultra-violet, as small as one-half a per cent of the ingredient in a cellulose acetate film appears to be sufficient for good protection in most instances. In curve 1 of Figure 2 is shown the spectrometric curve of cellulose acetate containing 10% by weight of triphenylphosphate, this plasticizer being merely used as an example of an excellent plasticizer for cellulose acetate having no protective effect, as a light filter on the sub-coating over which this cellulose acetate is applied. It will be seen that the absorption begins in the region of shorter wave lengths than those absorbed by cellulose nitrate. The addition of 1%, however, by weight of alpha chloronaphthalene to the mixture of cellulose acetate and triphenylphosphate described above, gives a spectrophotometric curve indicated at 2 in Figure 2. This curve has a sharp absorption at 310 millimicrons, which it will be observed lies to the right of the spectrum at the curve of the cellulose nitrate alone, curve 2 of Figure 1, and will, therefore, absorb any energy incident upon it containing wave lengths 320 millimicrons or shorter. Energy of these wave lengths will, therefore, be prevented from reaching the cellulose nitrate or other sub-coating and the ultra-violet decomposition of the sub-coating will therefore be avoided. Curve 3 of Figure 2 shows the effect of the addition of 2% alpha chloronaphthalene to a mixture containing 90 parts of cellulose acetate and 10 parts of triphenylphosphate respectively while curve 4, Figure 2 shows the addition of 5%.

Figure 4:
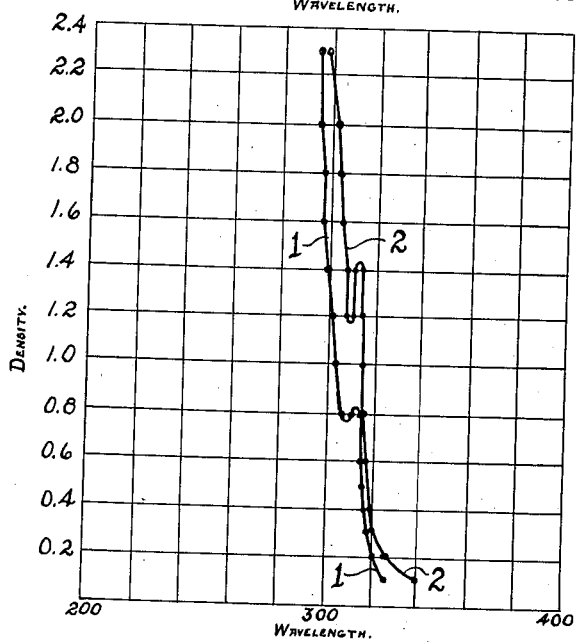

While naphthalene does not have as decided an absorption effect as alpha chloronaphthalene it, nevertheless, is sufficient to afford protection to sub-coatings such as cellulose nitrate. Curves showing its absorbing characteristics are shown in Figure 4. In curve 1 is illustrated a cellulose acetate film containing 2% naphthalene and in curve 2, 5% naphthalene. It will be noted that these curves lie slightly to the left of the cellulose nitrate film. In spite of that fact the protection afforded a cellulose nitrate sub-coating is remarkable. It appears that the small band allowed to pass does not have an appreciable degrading effect upon the nitrocellulose.

The amounts of these filters required to afford protection to sub-coatings from ultra-violet radiation are of such small magnitude that no appreciable plasticizing effect would be observed. Their presence in the cellulose acetate layer in such amounts in no way affects the plasticity or the other physical qualities of the film; they merely act as filters preventing the passage therethrough of the ultra-violet light.

It is evident from a study of the above that our invention covers the use of naphthalene and halogenated naphthalenes and particularly alpha chloronaphthalene either alone or in admixture with vehicles such, for example, as cellulose acetate and the employment of these lacquers or over-coatings for the protection of surfaces which have been coated with one or more coatings of materials which are more or less affected by the ultra-violet light. The vehicles in which this filter is used, or any method or means by which the filter may be applied is therefore within the scope of this invention, and any changes made therein, due regard being had to the above disclosure will not sacrifice the advantages of this invention nor depart from the scope thereof.

What we claim as our invention and desire to be secured by Letters Patent of the United States is:

1. An article of manufacture which has a closely adhering lacquer coating decomposable by sunlight, and a light-filtering overcoating comprising a cellulose organic derivative and a compound selected from the group consisting of naphthalene and halogenated naphthalenes, the overcoating being substantially transparent to visible light and having the characteristic, due to its content of the selected compound, that it is absorbent of substantially all the rays of light shorter than 320 millimicrons, the light-filtering substance being present in the overcoating in an amount sufficient to substantially completely prevent decomposition of the lacquer coating.

2. An article of manufacture which has a closely adhering lacquer coating decomposable by sunlight, and an overcoating which comprises cellulose acetate and a compound selected from the group consisting of naphthalene and halogenated naphthalenes, the overcoating being substantially transparent to visible light and having the characteristic, due to its content of the selected compound, that it is absorbent of substantially all the light shorter than 320 millimicrons, the light-filtering substance being present in the overcoating in an amount sufficient to substantially completely prevent decomposition of the lacquer coating.

3. An article of manufacture which has a closely adhering lacquer coating decomposable by sunlight, and an overcoating which comprises cellulose acetate and a chlorinated naphthalene, the overcoating being substantially transparent to visible light and having the characteristic, due to its chlorinated naphthalene content, that it is absorbent of substantially all the rays of light shorter than 320 millimicrons, the light-filtering substance being present in the overcoating in an amount sufficient to substantially completely prevent decomposition of the lacquer coating.

4. An article of manufacture which has a closely adhering lacquer coating decomposable by sunlight, and an overcoating which comprises cellulose acetate and naphthalene, the overcoating being substantially transparent to visible light and having the characteristic, due to its naphthalene content, that it is absorbent of substantially all the light shorter than 320 millimicrons, the light-filtering substance being present in the overcoating in an amount sufficient to substantially completely prevent decomposition of the lacquer coating.

5. An article of manufacture having a closely adhering cellulose nitrate lacquer coating with an overcoating of cellulose acetate containing from approximately ¼% to 5% of a compound selected from the group consisting of naphthalene and the halogenated naphthalenes, the overcoating being substantially transparent to visible light and having the characteristic, due to its content, of the selected compound, that it is absorbent of substantially all the rays of light shorter than 320 millimicrons, the light filtering substance being present in the overcoating in an amount sufficient to substantially completely prevent decomposition of the lacquer coating.

EARLE E. RICHARDSON.
CYRIL J. STAUD.